United States Patent [19]

Konecny

[11] Patent Number: 5,015,939
[45] Date of Patent: May 14, 1991

[54] CONTROL CIRCUIT FOR SWITCHED RELUCTANCE MOTOR

[75] Inventor: Karl Konecny, Portland, Oreg.

[73] Assignee: Synektron Corporation, Portland, Oreg.

[21] Appl. No.: 565,943

[22] Filed: Aug. 10, 1990

[51] Int. Cl.$^5$ ............................................. H02P 5/40
[52] U.S. Cl. .................................................. 318/701
[58] Field of Search ..................... 318/701, 720–723, 318/254, 138, 696

[56] References Cited

U.S. PATENT DOCUMENTS

| | | | |
|---|---|---|---|
| 3,368,128 | 2/1968 | Parrish | 318/696 |
| 4,520,302 | 5/1985 | Hill et al. | 318/696 |
| 4,595,865 | 6/1986 | Jahns | 318/138 |
| 4,933,620 | 6/1990 | MacMinn et al. | 318/696 |

Primary Examiner—David Smith, Jr.
Attorney, Agent, or Firm—Chernoff, Vilhauer, McClung & Stenzel

[57] ABSTRACT

A motor control circuit for a switched reluctance motor which includes a rotor and a plurality of stator coils, and a driver circuit for energizing the coils in sequence, includes a current sensing resistor for detecting a signal proportional to the current in the coils and a slope detector for detecting the rate of change of the current signal with respect to time over predetermined time intervals during which the voltage in the coils is dominated by a term representing back EMF. A variable oscillator is responsive to an integrated output of the slope detector for generating a timing signal for the driver circuit. When the voltage across the coils is dominated by the back EMF term, the current should be substantially constant, but when the rotor is out of phase with the driver circuit, the current signal during this time has a substantially linear slope which is either positive or negative depending upon whether the rotor is leading or lagging the driver circuit.

14 Claims, 6 Drawing Sheets

MOTOR & DRIVER IN ALIGNMENT

FIG. 5

DRIVER LAGGING MOTOR

FIG. 6

DRIVER LEADING MOTOR

FIG. 7

CONTROL CIRCUIT FOR SWITCHED RELUCTANCE MOTOR

BACKGROUND OF THE PRESENT INVENTION

The following invention relates to a sensorless control circuit for use with a switched reluctance electric motor.

Switched reluctance stepping motors employ an iron core rotor having a plurality of poles and pairs of stator coils aligned on opposite sides of the rotor so as to create a magnetic circuit when the poles of the rotor are aligned with the oppositely placed coils. The reluctance of the magnetic circuit is lowest when a pole pair is aligned directly between a pair of opposed coils. By sequentially energizing pairs of coils, the rotor is caused to rotate in order to find the position of lowest reluctance.

Control circuits for such motors typically include an external sensor which is connected to the rotor to sense rotor position. This signal is used to maintain alignment between the coil switching sequence and the rotor position. Hall effect sensors have long been employed for this purpose. A mechanical sensor is shown in the U.S. Pat. No. 3,601,678, to Abraham, et al. In the Abraham patent, a mechanical emitter coupled to the shaft of the rotor provides position information to a reader head which in turn generates a feedback signal to a control loop which controls motor speed. Sensors, however, take up space, are costly, and typically cannot withstand the harsh environments for which switched reluctance motors are rated.

Various types of sensorless control circuits exist for DC brushless motors which employ permanent magnet rotors. Permanent magnet rotors generate back EMF in stator coils which various sinusoidally. Thus, determining the phase of the back EMF signal gives an indication of rotor position. An example of this type of control circuit is shown in Plunkett, U.S. Pat. No. 4,928,043 entitled BACK EMF SAMPLING CIRCUIT FOR A PHASE-LOCKED LOOP MOTOR CONTROL which is assigned to the same assignee as the present invention. The Plunkett invention discloses a sensing network for sensing the back EMF on an unenergized motor winding. This signal represents a phase error when compared with an optimum value and drives a voltage controlled oscillator which in turn generates timing signals for an inverter. However, because switched reluctance motors do not employ permanent magnets, there is no back EMF induced in an unenergized coil as a direct result of rotor rotation.

The inductance in the coils does vary as a function of rotor position. When a pair of rotor poles become aligned with a pair of stator coils, the inductance reaches a maximum. In the past, motor designers have attempted to build control loops utilizing some value of sensed inductance. However, this requires complex bridge circuitry which tends to have a high level of noise associated with it. Saturation and hysterysis effects also compromise inductance sensing techniques.

SUMMARY OF THE PRESENT INVENTION

The present invention solves the aforementioned problems in a switched reluctance stepping motor by providing a current sensing circuit to detect a signal proportional to current in the energizing coils of the motor. A slope detector determines the rate of change of the signal proportional to current over a set of discrete time intervals. The time intervals are provided by a window generator which masks the slope detector during periods when the current signal is rapidly fluctuating so that sampling takes place only when the current signal is either slowly increasing with time, slowly decreasing with time or constant. A variable oscillator is responsive to an integrated output of the slope detector and generates timing pulses for a driver circuit which is coupled to the energizing coils.

This circuit operates on the theory that back EMF is generated by the driving current and rotor rotation. A switched reluctance motor does not generate back EMF in the sense that a DC motor does; that is, externally spinning the rotor of an unenergized switched reluctance motor does not produce a voltage on the windings as is seen in a DC permanent magnet motor. A switched reluctance motor does, however, convert electrical power into mechanical power. Therefore, some generated voltage must exist to oppose the current and force the supply to provide power at least equal to the mechanical output power.

The voltage and torque equations for a switched reluctance motor operating in the linear region (no saturation) are as follows:

$$V = i \cdot R + d(L \cdot i)/dt$$

$$T = 1/2 \cdot (dL/d\theta \cdot i) \cdot i$$

The induction component in the voltage equation is written with both the inductance and current inside the derivative because both components vary in time. The voltage equation can be expanded as:

$$V = i \cdot R + di/dt \cdot L + (dL/d\theta \cdot i) \cdot \Omega$$

where $\Omega = d\theta/dt$. The term $(dL/d\theta \cdot i) \cdot \Omega$ is a term which represents back EMF. This is the voltage generated by the energy conversion process. The term inside the parentheses also appears in the torque equation but is multiplied by one-half. Thus, only half of the energy converted due to the change of inductance with position is converted as mechanical work. The other half is stored in internal magnetic fields.

In order to obtain maximum torque and efficiency, the current pulse should be aligned with the peak of the back EMF term. This occurs when $dL/d\theta$ is at a maximum. When a coil is energized, current begins to rise quickly, the voltage-current relationship is dominated by the $di/dt \ast L$ term. The current will soon level off and, because $di/dt$ is nearly zero, the voltage-current relationship is dominated by the back EMF term. If the current pulse and back EMF is aligned, the slope of the current will be zero. If the current pulse is leading the back EMF then the $dL/d\theta$ term will be increasing toward its maximum. The current will decrease during this period in order to keep the product $dL/d\theta \ast i$ constant. If the current pulse is lagging the back EMF, then the $dL/d\theta$ term will be past its maximum and decreasing. The current will increase during this period. The circuit of the invention senses the current in the coils and detects the slope of the current pulse with respect to time during the time intervals that the back EMF dominates the voltage-current relationship. The resulting signal is proportional to the phase error between the rotor position and drive waveforms.

In one embodiment of the invention a differentiator is used as a slope detector. Since only the peak portions of each phase are dominated by the back EMF term, the invention utilizes a window generator to mask the slope detector during transitional periods where one coil is turned off and the next coil is turned on. This is to isolate the slope detector during times when the current changes rapidly due to switching transitions from one coil to the next.

In a second embodiment, the slope detector includes a switched inverting amplifier that divides the current peak into two equal portions, inverts one portion and compares the relative amplitudes of each. The comparator output should be zero when the motor is in phase but produces a net positive or negative error signal when out of phase.

In a third embodiment, the slope detector, window generator, proportional integral controller (PI controller), VCO, and sequencer may be implemented in a digital processor. For the slope detector, the current is digitally sampled at the beginning of the window and again at the end. The phase error signal is generated as the arithmetic difference between these two values.

A principal object of this invention is to provide a sensorless control circuit for a switched reluctance motor.

Another object of the invention is to provide an essentially noise immune control loop for a switched reluctance motor using a minimum number of components.

A further object of the invention is to provide a control loop which senses the slope of the currents in the motor coils at a time when back EMF is at a maximum to generate a phase error signal indicating whether the motor rotation is in phase with, leading or lagging the driving current pulses.

The foregoing and other objectives, features, and advantages of the invention will be more readily understood upon consideration of the following detailed description of the invention, taken in conjunction with the accompanying drawings.

DETAILED DESCRIPTION OF THE DRAWINGS

DETAILED DESCRIPTION OF THE INVENTION

Figures 1, 3:
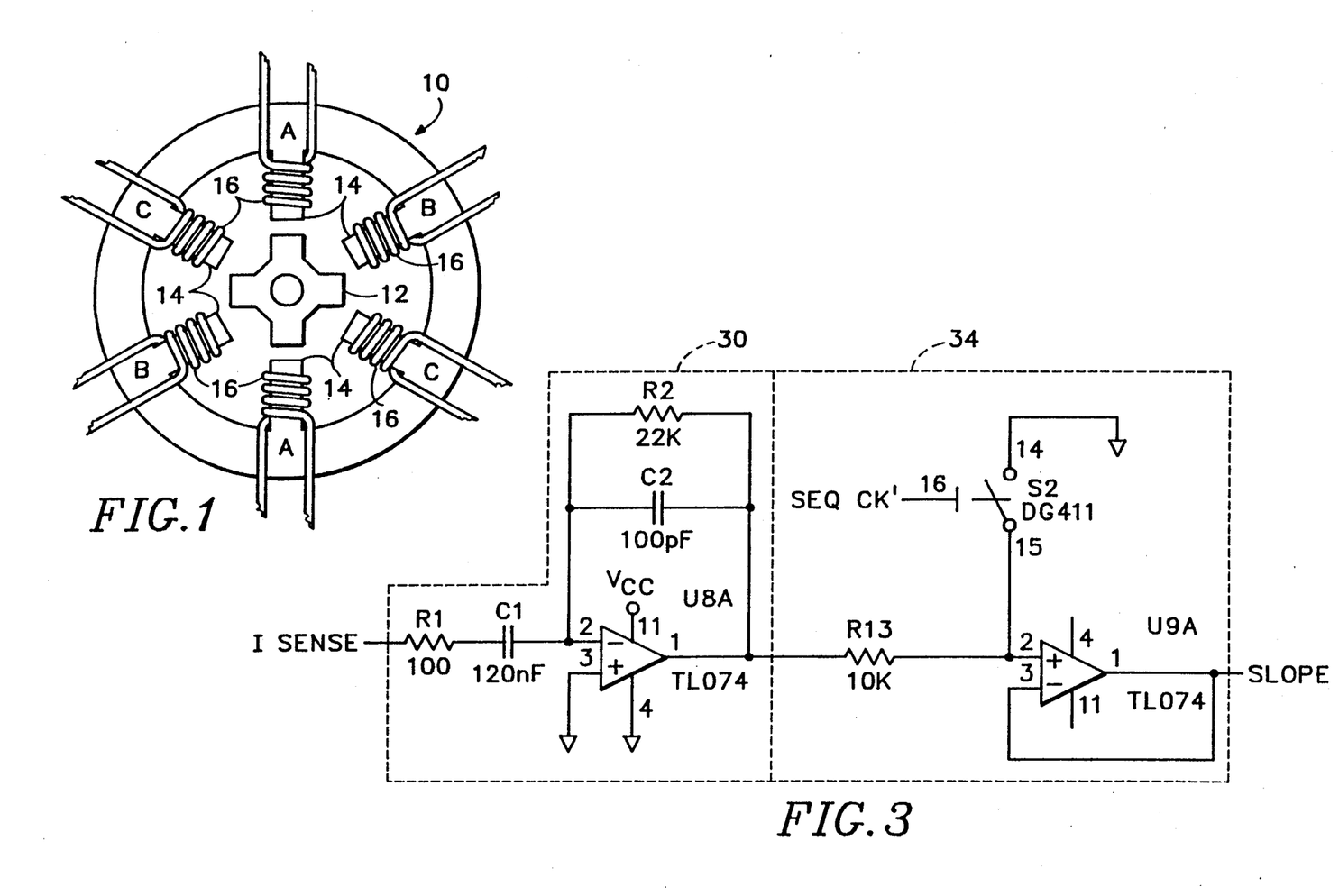
FIG. 1 is a schematic diagram of a conventional switched reluctance stepping motor.
FIG. 3 is a schematic diagram of a slope detector circuit employing a differentiator.

A switched reluctance motor 10 includes a rotor 12 constructed of magnetically permeable material such as iron. The rotor 12 is surrounded by a plurality of stator poles 14 wrapped with wire coils 16. There are three sets of poles 14 labeled A, B and C with each set containing two mutually opposed poles. The coils 16 of the pole pairs 14A, 14B and 14C are energized by a driver circuit 18 (refer to FIG. 2). The driver 18 is controlled by a sequencer 20 which is in turn driven by a voltage controlled oscillator 22. A counter 24 coupled to the sequencer 20 provides an output indicative of rotor position. The sequencer 20 provides timing pulses for the driver 18 which in turn drives the motor 10 with a three phase driving voltage.

Figure 2:
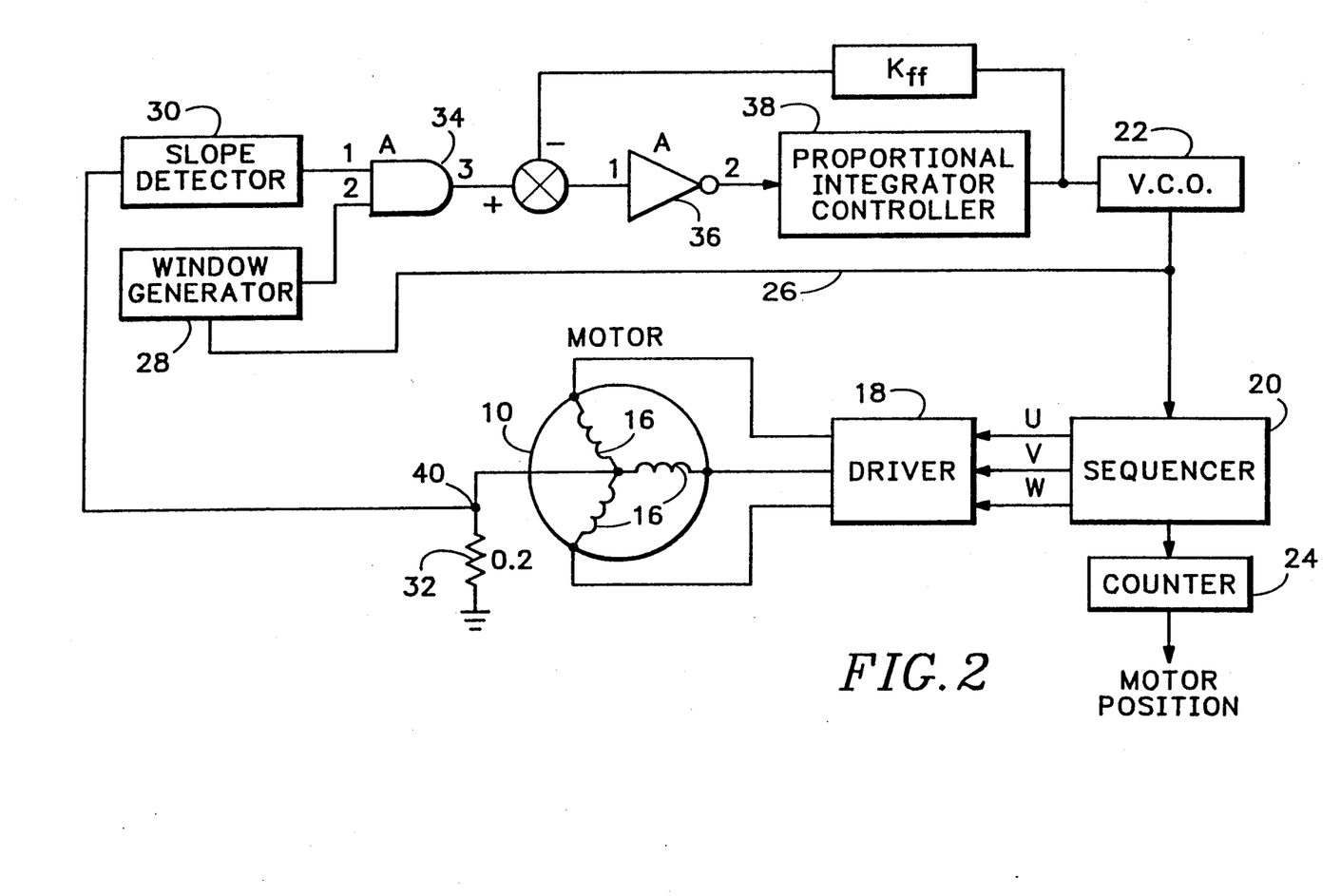
FIG. 2 is a block schematic diagram of a control circuit for a switched reluctance stepping motor.

A feedback line 26 connects the output of the voltage controlled oscillator (VCO) 22 with a window generator 28. The purpose of the window generator 28 is to mask certain portions of the output (or the input) of a slope detector 30 which senses the slope of signals proportional to current which are sensed through a current sensing resistor 32. The current signal from resistor 32 forms an input to the slope detector 30, and the slope detector output forms a first input to an AND gate 34. The other input to the gate 34 is the output of the window generator 28. The output of the gate 34 is coupled to inverting amplifier 36 which is in turn connected to a PI controller 38. The output of the PI controller 38 forms the input to the VCO 22. The coils 16 for stator poles A, B and C are connected to a common node 40 to which current sensing resistor 32 is also connected. The current signal at node 40 is thus the sum of the currents flowing in the coils 16 at any point in time.

The output of the PI controller 38 will adjust the phase of the VCO 22 until the phase error signal is zero. This occurs when the rotor rotation and the driver 18 are in phase. In certain applications it is desirable to control the driver 18 to lead the motor 10 at high speeds. This allows the current to rise to a higher level before the back EMF dominates the voltage-current relationship. This produces greater output torque and power at the cost of a small decrease in efficiency.

This feature can be implemented by adding velocity feed forward. The input to the VCO 22 is indicative of motor velocity. It can be fed forward through a gain element $K_{ff}$ and subtracted from the phase error signal. The gain element could be a simple resistor. At low speeds, this term is negligible and the driver will be in phase with the rotor rotation. At high speeds, the velocity feed forward becomes significant and the PI controller 38 will adjust the phase of the VCO 22 until the difference between the phase error and the velocity feed forward term is zero. Thus, the driver will lead the motor which produces the required negative phase error signal.

Figure 5:
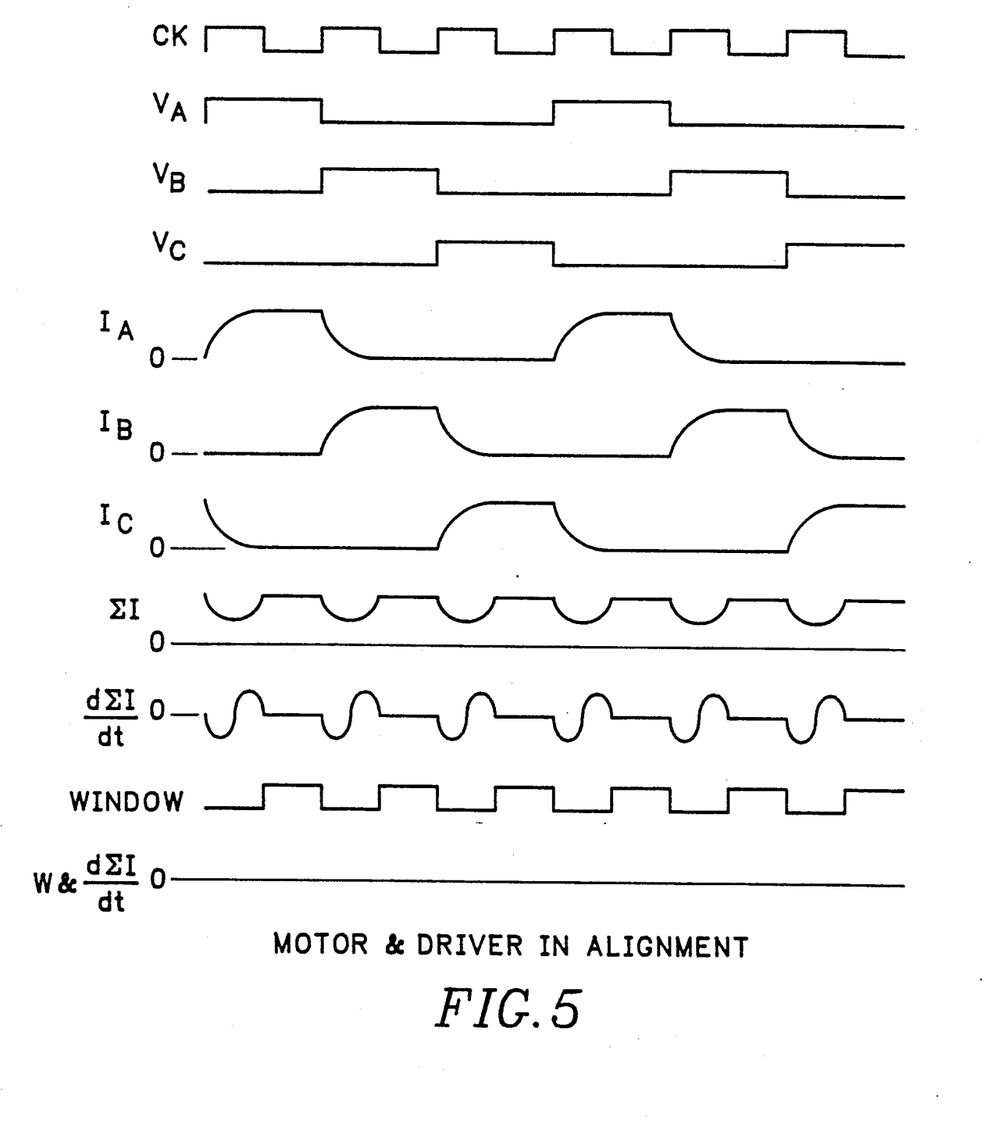
FIG. 5 is a set of waveform diagrams illustrating the function of the control circuit of FIG. 2 when the rotor and driver circuit are in phase alignment.
Figure 6:
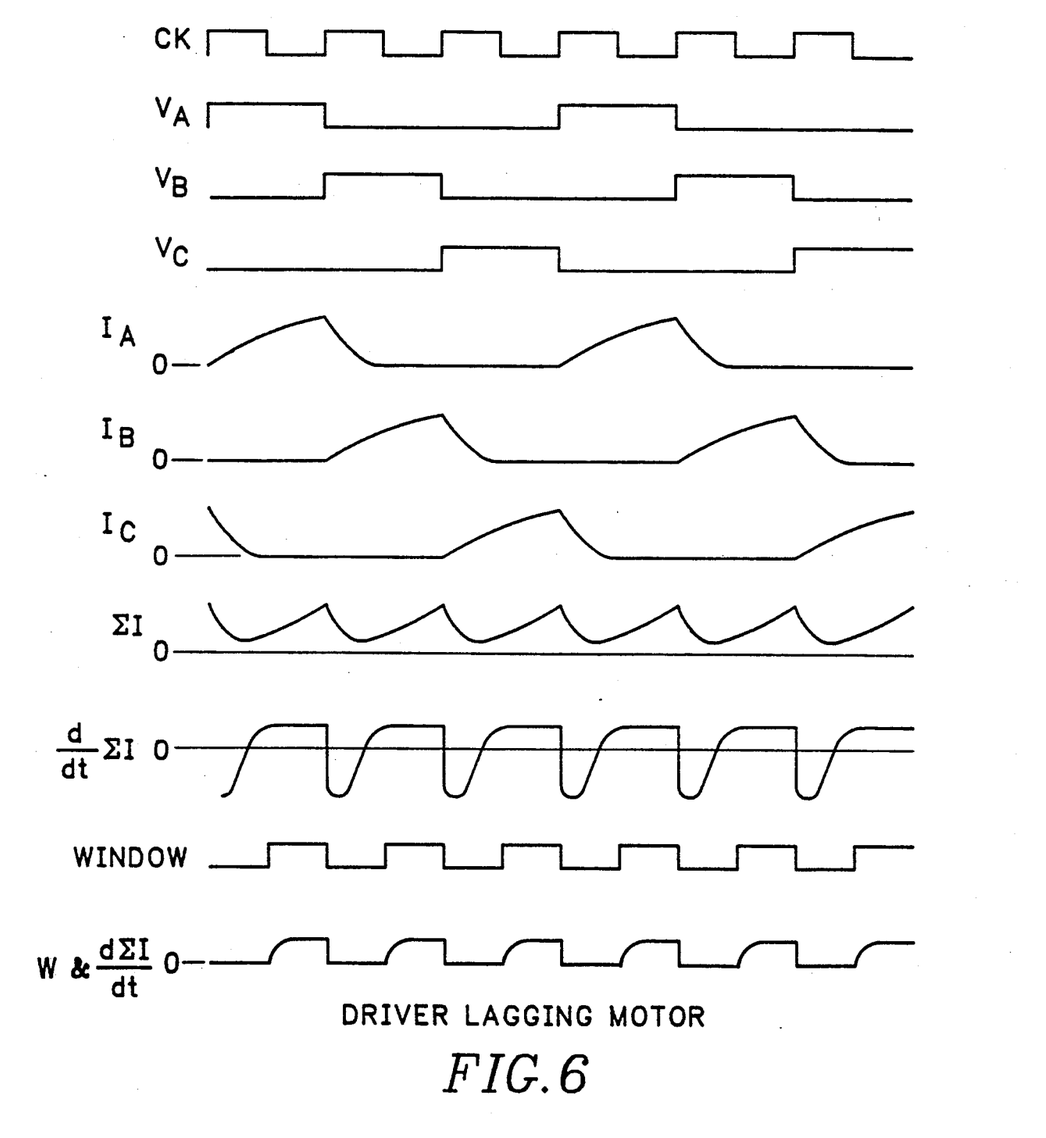
FIG. 6 is a set of waveform diagrams illustrating the function of the control circuit of FIG. 2 when the driver circuit lags actual rotor position.
Figure 7:
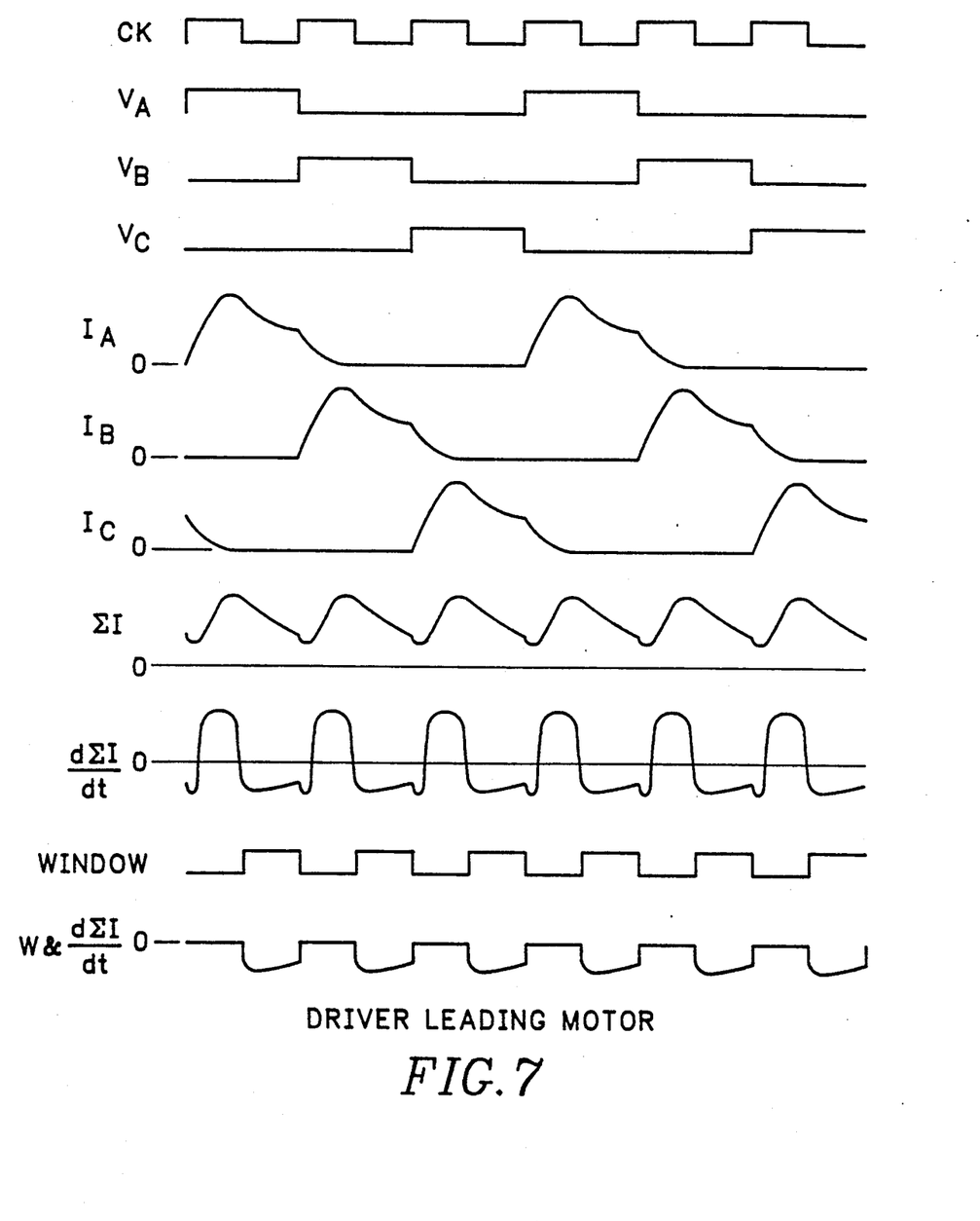
FIG. 7 is a waveform diagram similar to FIG. 6 illustrating the condition when the motor driver circuit leads the actual rotor position.

Waveform diagrams shown in FIGS. 5, 6 and 7 illustrate the operation of the invention, for the cases phase alignment, phase lag and phase lead respectively. A clock pulse train generated by the sequencer 20 causes the driver 18 to produce driving voltages $V_a$, $V_b$ and $V_c$. These voltage pulses are impressed upon the coils sequentially to form current pulses $I_{a0}$, $I_{b0}$, and $I_{c0}$ where a, b and c stand for the three motor coil pairs. The next waveform represents the sum of the current pulses at node 40. It is this signal which is sensed by the current sensing resistor 32 and provided as an input to the slope detector 30. The next waveform in FIG. 5 represents the derivative with respect to time of the current sum signal and is the output of the slope detector 30. The window generator 28 generates pulses which mask the derivative signal during times when it is rapidly fluctuating due to transitions from one coil to the next by the driver 18. When the window generator signal is slow the output of AND gate 34 is blocked.

The result is shown in the bottom-most line of FIG. 5 where the output is essentially zero because the driving voltage and the back EMF are in phase. It should be recalled that the signal generated by back EMF is dependent upon rotor position.

When the rotor position and the driving voltage pulses are out of phase, the output of gate 34 is of the form shown in the bottommost waveform of FIG. 6 or FIG. 7. The positive or negative pulses representing either the lagging or leading of the rotor position with respect to the driver pulses are inverted in amplifier 36 and integrated by PI controller 38. The result is an analog voltage that controls the frequency of the VCO 22.

The preferred form of the slope detector is shown in FIG. 3. The current sum signal from resistor 32 is applied to a differentiator circuit 30 comprising resistor R1 connected in series with capacitor C1 which is in turn connected in series with amplifier U8A. The output of amplifier U8A is coupled through resistor R13 to gate circuit 34 comprising buffer amplifier U9A and switch S2. The switch S2 is connected in parallel with the positive input to amplifier U9A. This input is grounded whenever switch S2 is closed. Switch S2 is closed when the window signal provided by window generator 28 is low. This periodically masks the output of the slope detector 30 and the portions of its output that are passed to the PI controller 38 are those where the slope is determined by the back EMF. Nonlinearities in the slope signal which occur around transitions in the driving signal from one coil to the next are eliminated.

Figure 4:
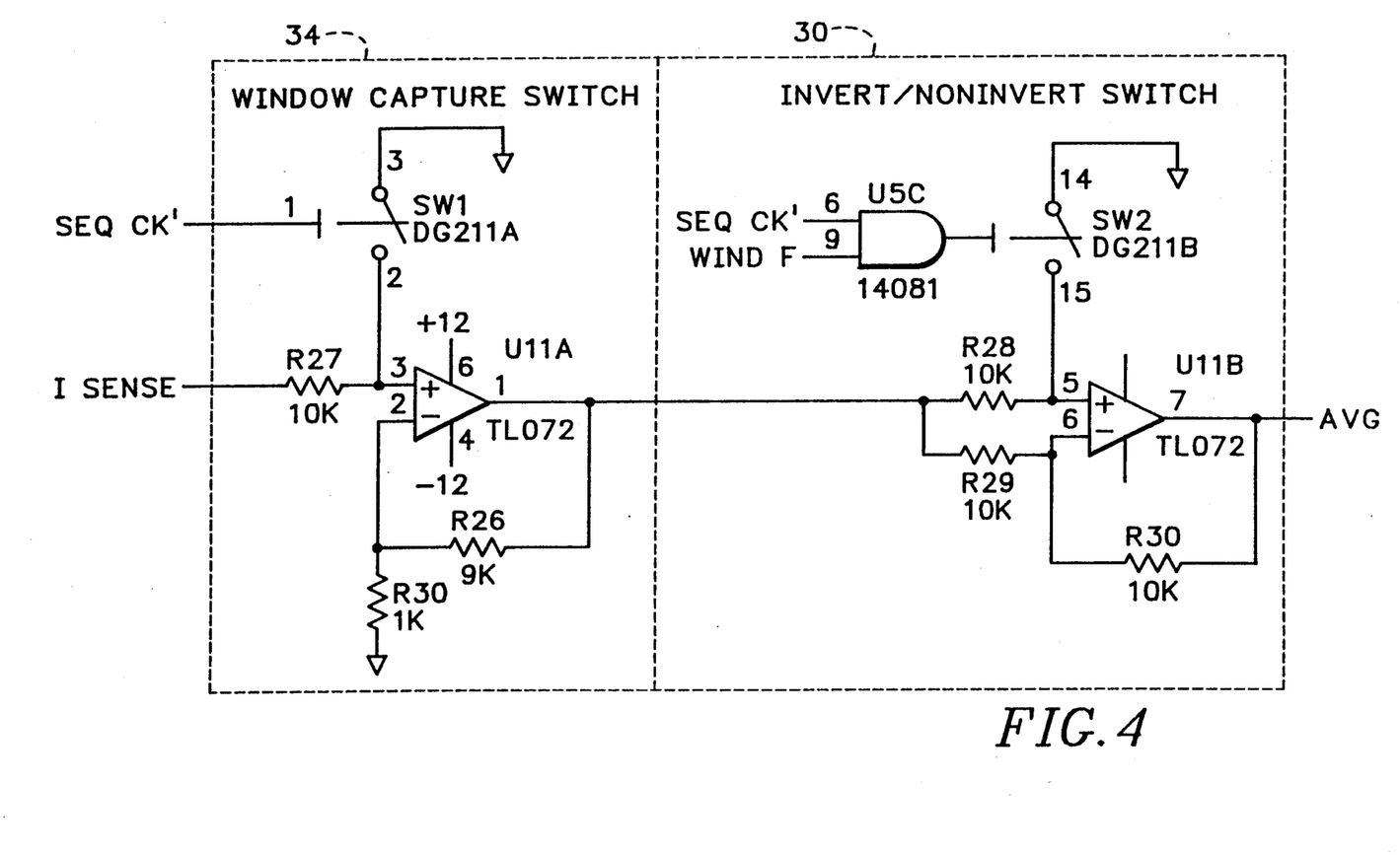
FIG. 4 is a schematic diagram of another form of a slope detector circuit employing a switching inverting amplifier.

A second form of the slope detector is shown in FIG. 4. According to this embodiment of the invention, the detection of the slope of the current sum signal takes place after masking by the window generator. Thus, to reconcile the embodiment of FIG. 4 with the schematic diagram of FIG. 2 the connections between gate 34 and slope detector 30 would be reversed. Referring to FIG. 4 the current sum signal is applied through a resistor R27 to an amplifier U11A which functions as a buffer. This signal is grounded by switch SW1 which is driven by a signal from the window generator. The pulsed output of the buffer amplifier U11A is applied to an inverting amplifier U11B. The positive input to amplifier U11B is connected through a switch SW2 to ground. The switch SW2 is controlled by a gate U5C which includes a clock input which operates at the frequency of the VCO and a signal derived from the window generator circuit which operates at twice the frequency of the VCO. This causes switch SW2 to effectively divide each pulse from the output of amplifier U11A into inverted and noninverted portions. When the rotor position and the motor driver are in phase alignment the positive and negative portions of each detected slope pulse are the same but when the signal either leads or lags the rotor position the portions become unequal, thus generating a phase error signal which is integrated to become an analog control voltage for the VCO.

Alternative structures for the various components disclosed herein may be used without departing from the spirit of the invention. Other sensing methods may be employed to sense a signal proportional to current, and other slope detection methods may also be used to determine the phase error between the driver pulses and rotor position.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A motor control circuit for a switched reluctance electric motor, said motor having a plurality of stator poles wound with coils, said coils being coupled to a driver circuit for energizing said coils in sequence, comprising:
   (a) current sensing means coupled to said coils for detecting a signal proportional to current in said coils;
   (b) slope detection means for detecting the rate of change of said signal with respect to time over predetermined time intervals during which the change in inductance with respect to rotor position is substantially at a maximum; and
   (c) variable oscillator means responsive to an integrated output of said slope detection means for generating a timing signal for said driver circuit.

2. The motor control circuit of claim 1 wherein said current sensing means comprises resistor means coupled to a node common to at least a plurality of said coils.

3. The motor control circuit of claim 1 further including window generator means for providing pulses defining said predetermined time intervals wherein said signal is masked during switching transitions from one coil to the next.

4. The motor control circuit of claim 1 wherein said slope detection means comprises a differentiator.

5. The motor control circuit of claim 1 wherein said signal is the sum of currents flowing in at least a plurality of said coils.

6. A motor control circuit for a switched reluctance electric motor, said motor including a plurality of coils coupled to a driver circuit for energizing said coils in sequence, comprising:
   (a) current sensing means for detecting a signal proportional to current in said coils;
   (b) slope detection means for determining the rate of change of said signal over preset time intervals;
   (c) window generator means for masking said slope detection means between said preset time intervals; and
   (d) means responsive to an output of said slope detection means for generating timing pulses for said driver circuit.

7. The motor control circuit of claim 6 wherein said preset time intervals correspond to periods when the voltage across said coils is substantially due to a back EMF.

8. The motor control circuit of claim 6 wherein said current sensing means comprises a current sensing resistor.

9. The motor control circuit of claim 6 wherein said slope detection means comprises a differentiator network.

10. The motor control circuit of claim 6 wherein said slope detection means comprises a periodically switched inverting amplifier.

11. The motor control circuit of claim 8 wherein said resistor is coupled to a node common to at least a set of said coils.

12. The motor control circuit of claim 6 wherein said means responsive to said output of said slope detection means comprises an integrator circuit for producing a voltage for controlling variable oscillator means.

13. The motor control of claim 1, further including a velocity feed forward loop.

14. The motor control of claim 6, further including a velocity feed forward loop.

* * * * *

UNITED STATES PATENT AND TRADEMARK OFFICE
CERTIFICATE OF CORRECTION

PATENT NO. : 5,015,939
DATED : May 14, 1991
INVENTOR(S) : Karl Konecny

It is certified that error appears in the above-identified patent and that said Letters Patent is hereby corrected as shown below:

Col. 1, line 36, change "various" to --varies--.

Col. 3, line 50, change "switching" to --switched--.

Col. 4, line 68, change "slow" to --low--.

Col. 5, line 8, change "bottommost" to --bottom-most--.

Signed and Sealed this

Twenty-fourth Day of November, 1992

Attest:

DOUGLAS B. COMER

*Attesting Officer*   *Acting Commissioner of Patents and Trademarks*